US00RE47836E

(19) United States
(12) Reissued Patent
Stockhold Johansson

(10) Patent Number: US RE47,836 E
(45) Date of Reissued Patent: Feb. 4, 2020

(54) FLIGHT CONVEYOR

(71) Applicant: Laitram, LLC, Harahan, LA (US)

(72) Inventor: Palle Stockhold Johansson, Odense NV (DK)

(73) Assignee: LAITRAM, L.L.C., Harahan, LA (US)

(21) Appl. No.: 15/998,247

(22) Filed: Mar. 23, 2017

Related U.S. Patent Documents

Reissue of:
(64) Patent No.: 8,985,311
Issued: Mar. 24, 2015
Appl. No.: 14/343,816
PCT Filed: Sep. 10, 2012
PCT No.: PCT/DK2012/050338
§ 371 (c)(1),
(2) Date: Mar. 7, 2014
PCT Pub. No.: WO2013/037376
PCT Pub. Date: Mar. 21, 2013

(30) Foreign Application Priority Data

Sep. 12, 2011 (DK) ..... PA 2011 70499

(51) Int. Cl.
*B65G 45/12* (2006.01)
*B65G 17/18* (2006.01)
(Continued)

(52) U.S. Cl.
CPC ..... *B65G 45/12* (2013.01); *B65G 15/42* (2013.01); *B65G 17/18* (2013.01); *B65G 17/40* (2013.01);
(Continued)

(58) Field of Classification Search
CPC ..... B65G 17/18; B65G 17/40; B65G 15/42; B65G 45/12; B65G 21/22; B65G 17/067;
(Continued)

(56) References Cited

U.S. PATENT DOCUMENTS 1,506,843 A * 9/1924 Komarnisky ..... B65G 17/18 198/693
2,866,568 A * 12/1958 Bishton ..... 414/523
(Continued)

FOREIGN PATENT DOCUMENTS

AT 262881 6/1968
DE 1 024 428 6/1953
(Continued)

OTHER PUBLICATIONS

International Search Report, PCT/DK2012/050338, mailed Dec. 20, 2012.

*Primary Examiner* — William C Doerrler
(74) *Attorney, Agent, or Firm* — Olson & Cepuritis, Ltd.

(57) ABSTRACT

A flight conveyor for conveying material includes a frame, drive and idler wheel(s) rotatably mounted on the frame, segments for supporting the material, shafts for pivotally interconnecting the segments to an endless row which has an upper row and a lower row running, during operation, over the drive and idler wheel(s) and a number of conveyor flights for bringing the material along in the conveying direction. A scraper is arranged at the drive wheel for successively scraping off adhered material from segments and flights such that the conveyor can be used for conveying products tending to adhere to the surfaces of the segments and the flights since the adhered products are automatically removed by the scraper.

54 Claims, 4 Drawing Sheets

(51) Int. Cl.

| | |
|---|---|
| ***B65G 15/42*** | (2006.01) |
| ***B65G 17/40*** | (2006.01) |
| ***B65G 21/22*** | (2006.01) |
| ***B65G 17/06*** | (2006.01) |

(52) U.S. Cl.
CPC ..... *B65G 21/22* (2013.01); *B65G 17/067* (2013.01); *B65G 2201/0202* (2013.01)

(58) Field of Classification Search
CPC . B65G 2201/0202; B65G 17/16; G65G 15/44
USPC ..... 198/494–499, 703–706, 732, 697, 690.2
See application file for complete search history.

(56) References Cited

U.S. PATENT DOCUMENTS

| | | | | | |
|---|---|---|---|---|---|
| 3,534,848 | A * | 10/1970 | Marks | B65G 19/26 | 198/697 |
| 3,694,999 | A | 10/1972 | Switliski et al. | | |
| 3,805,420 | A * | 4/1974 | Crum | 198/497 | |
| 3,812,955 | A | 5/1974 | Kopp | | |
| 3,973,668 | A | 8/1976 | Stansfield | | |
| 4,126,219 | A | 11/1978 | Bross | | |
| 4,206,708 | A | 6/1980 | Behle | | |
| 4,417,653 | A | 11/1983 | Zwezerynen | | |
| 4,505,093 | A | 3/1985 | Johnson | | |
| 4,890,724 | A | 1/1990 | Loewenthal | | |
| 5,178,263 | A | 1/1993 | Kempen | | |
| 5,501,318 | A | 3/1996 | Disrud | | |
| 5,706,934 | A | 1/1998 | Palmaer et al. | | |
| 6,390,285 | B2 * | 5/2002 | de Geus et al. | 198/732 | |
| 6,662,933 | B2 | 12/2003 | De Guglielmo et al. | | |
| 2007/0209909 | A1 * | 9/2007 | Fourney | B65G 17/24 | 198/728 |
| 2009/0242358 | A1 | 10/2009 | Fourney | | |
| 2012/0018281 | A1 * | 1/2012 | McCormick | B65G 17/068 | 198/493 |
| 2012/0285799 | A1 | 11/2012 | Fourney | | |

FOREIGN PATENT DOCUMENTS

| | | | |
|---|---|---|---|
| DE | 73 08 742 | | 6/1973 |
| DE | 73 08 742 | U | 6/1973 |
| DE | 89 15 286 | U1 | 5/1990 |
| DE | 44 41 301 | C1 | 1/1996 |
| EP | 1 064 210 | B1 | 9/1999 |
| EP | 1 064 210 | B1 | 1/2001 |
| EP | 1 826 159 | A1 | 8/2007 |
| FR | 2 448 975 | A1 | 9/1980 |
| GB | 415 063 | | 8/1934 |
| GB | 2 091 200 | | 7/1982 |
| JP | 2000-085938 | | 3/2000 |
| WO | WO 94/03383 | A1 | 2/1994 |
| WO | WO 99/48779 | A1 | 9/1999 |
| WO | WO 2009/120628 | A1 | 10/2009 |
| WO | WO 2011/087937 | A1 | 7/2011 |

* cited by examiner

FLIGHT CONVEYOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is *a reissue of U.S. Pat. No. 8,985,311, issued Mar. 24, 2015, which is* a 371 filing of International [Patent] Application PCT/DK2012/050338 filed Sep. 10, 2012 which claims priority to Danish application no. PA 2011 70499 filed Sep. 12, 2011.

BACKGROUND

The invention relates to a flight conveyor of the kind which is arranged for conveying a material from one position to another one and which comprises a frame, at least one drive wheel and at least one idler wheel rotatably mounted on the frame, a number of segments for supporting the material, a number of shafts for pivotally interconnecting the segments to an endless row which has an upper and lower row part and is running, during operation, over the at least one drive wheel and the at least one idler wheel, and a number of conveyor flights for bringing the material along in the conveying direction.

Flight conveyors are generally used for conveying materials from a lower level to a higher level. The conveyors are, owing to that function, frequently called elevators. The orientation of at least a section of such conveyors is inclined. The flights secure the materials against sliding down the conveyor during operation.

The conveyors are inter alia used in the food industry for conveying e.g. piece-formed products such as feta cubes, paste stuffing and paste screws. Such products are often light and also sticky whereby the serious problem arises that some of the products adheres to the surface of the segments and the flights and in this way goes to waste.

The patent publication JP 2000085938 describes a cleaner device for a flight conveyor. The flights have a stationary position in relation to the conveyor. A wiper on one end of a rocker arm is adapted for intermittently scraping dust adhering to the flights. The construction of said known cleaner device is complicated and costly and the intermittent operation of the cleaner device is unstable. A satisfactory result can moreover not be obtained when the conveyor with the cleaner device is used in the food industry where the product to be removed is not dust.

A conveyor with flights mounted on links of chains is known from the publication GB 415063. The flights are angularly displaceable relative to the chains. The angular position changes when passing the sprockets between being perpendicular to the chains and parallel to the chains. The conveyor is adapted for pushing mass material forwards in a duct in the perpendicular state of the flights and back in the parallel state with a reduced cross-sectional area through a smaller return duct. This known conveyor is unsuitable for conveying products in the food industry. The shape of piece-formed products like e.g. feta cubes would easily be destroyed. No cleaning device for cleaning the flights for adhered material is disclosed.

EP 1826159 describes a conveying system comprising a conveyor belt provided with at least one guiding element for moving at least one module over at least part of the conveying path from a normal position to a raised operating position relative to the plane of transport of the conveyor belt. Furthermore, since the guiding elements are connected to the conveyor belt at several points, said elements are not capable of pivoting freely, but only to move at least one module of the conveying path. Accordingly, the known conveyor is adapted for conveying basically bulk objects, and is unsuitable for conveying object from the food industry, which will have a tendency to slide down the belt and be destroyed during the conveying process.

SUMMARY OF THE INVENTION

The above-mentioned disadvantages of the prior art flight conveyors are according to the present invention remedied by in a first aspect of the invention providing a flight conveyor of the kind mentioned in the opening paragraph, which is well suited for being used in the food industry, in a second aspect of the invention providing a flight conveyor of the kind mentioned in the opening paragraph, which can be used for carefully conveying a piece-formed product, in a third aspect of the invention providing a flight conveyor of the kind mentioned in the opening paragraph, which can be used for conveying a sticky product with less loss of material than hitherto known, in a fourth aspect of the invention providing a flight conveyor of the kind mentioned in the opening paragraph with a self-cleaning arrangement, in a fifth aspect of the invention providing a flight conveyor of the kind mentioned in the opening paragraph in which the cleaning operation proceeds stably and effectively, in a sixth aspect of the invention providing a flight conveyor of the kind mentioned in the opening paragraph in which the self-cleaning arrangement is simple and inexpensive.

The novel and unique features of the invention consist in the fact that the flights are pivotally mounted on each their shaft, that at least one rail is extending between the idler wheel and the drive wheel in an area below the upper row part, that at least one slide, which is mounted on the back of each flight, seen in the conveying direction, is slidingly supported by the at least one rail, and that removing means is arranged at the drive wheel for successively removing adhered material from segments and flights passing the removing means during operation.

The flights are, since the rails support them, kept in a position preferably perpendicular to the upper row of segments when travelling the distance from the idler wheel to the drive wheel, whereby they effectively can prevent the material from sliding down the conveyor.

When having disengaged the rails the flights are allowed to pivot freely around the axis of their respective shafts and take up a position parallel to the segments when passing the removing means. In order to ensure that the flights are allowed to pivot freely around the axis of their shafts, each flight is preferably connected to only one shaft.

According to the invention, adhered material can in this position be removed from the flights by passing the edge of a scraper, which is close to or is abutting on the surface of the flights. The same scraper is adapted to simultaneously remove adhered material from the surface of the segments which are successively passing the scraper.

Thereby according to the invention, a simple and inexpensive self-cleaning arrangement is obtained, which operates in a stable and effective way.

Another advantage consists in the fact that removed material can be used instead of going to waste as conventionally. Using the flight conveyor according to the invention is therefore very economical especially in the food industry where much and often costly food tends to adhere to the flights and the segments during operation.

According to the invention the segment behind each flight can be formed with a recess corresponding to the shape of the flight so that the front surface of each flight passes the scraper in the same relative level as the surface of the segments whereby adhered material thoroughly can be removed from the flights just as well as from the segments.

The upper face of both ends of the rails can, according to the invention, describe a descending curve. Said curves ensure that the slides of the flights gradually disengage the rails for being brought from a fixed position for example perpendicular to the upper row part of segments to a pivoted position at the drive wheel and that the slides of the flights gradually engage the rails again at the idler wheel for being pivoted back to their previous position on the upper row part of segments.

According to the invention the segment behind each flight is formed with a through slit for allowing the slide of the flight to engage the underlying rail.

The thickness of each flight corresponds, according to the invention, to the width of the slit so that conveyed material is not able to penetrate through the slit.

For the same reason the back of each slide has, according to the invention, a shape like a sector of a circle with the centre placed in the axis of the shafts and a radius having a length corresponding to the distance from the axis of the axle to the distant end of the slit.

Each slide therefore closes the slit in all positions that the slide can occupy during pivoting in the slit.

The pivoting of each slide from the for example perpendicular state on the upper row part of segments to the pivotal state at the drive wheel and back at the idler wheel is best carried out when the slide engages the respective rail with a slide shoe placed at the periphery of slide.

In another embodiment of the invention the shafts of the flight conveyor can be connected to two opposite chains placed at each their side of the rows of segments and each of those chains can run, during operation, over a drive sprocket and an idler sprocket rotatory mounted on the frame of the conveyor belt.

This construction allows each slit to extend transversely over at least the major part of the respective segment and to be open to the previous segment. The slide, which fills up the slit, is then close to or abuts the previous segment.

This implies that said previous segment functions as a scraper removing material adhered to the cylinder face formed back of the slide pivoting in the slit.

BRIEF DESCRIPTION OF THE DRAWINGS

The object, features and advantages of the invention will be explained in more details in the following with reference to the drawing in which.

DETAILED DESCRIPTION OF THE INVENTION

Figure 2:
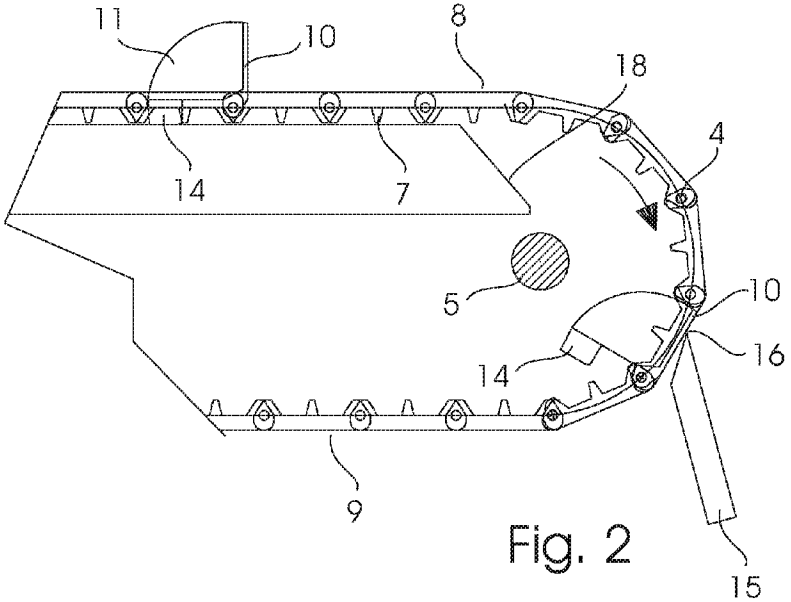
FIG. 2 is a fragmentary lateral view of the drive wheel section of the flight conveyor according to the invention.
Figure 1:
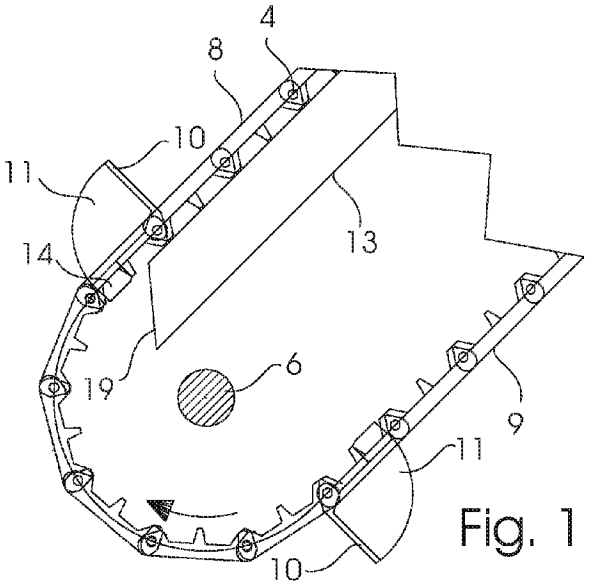
FIG. 1 is a fragmentary lateral view of the idler wheel section of the flight conveyor according to the invention.
Figure 3:
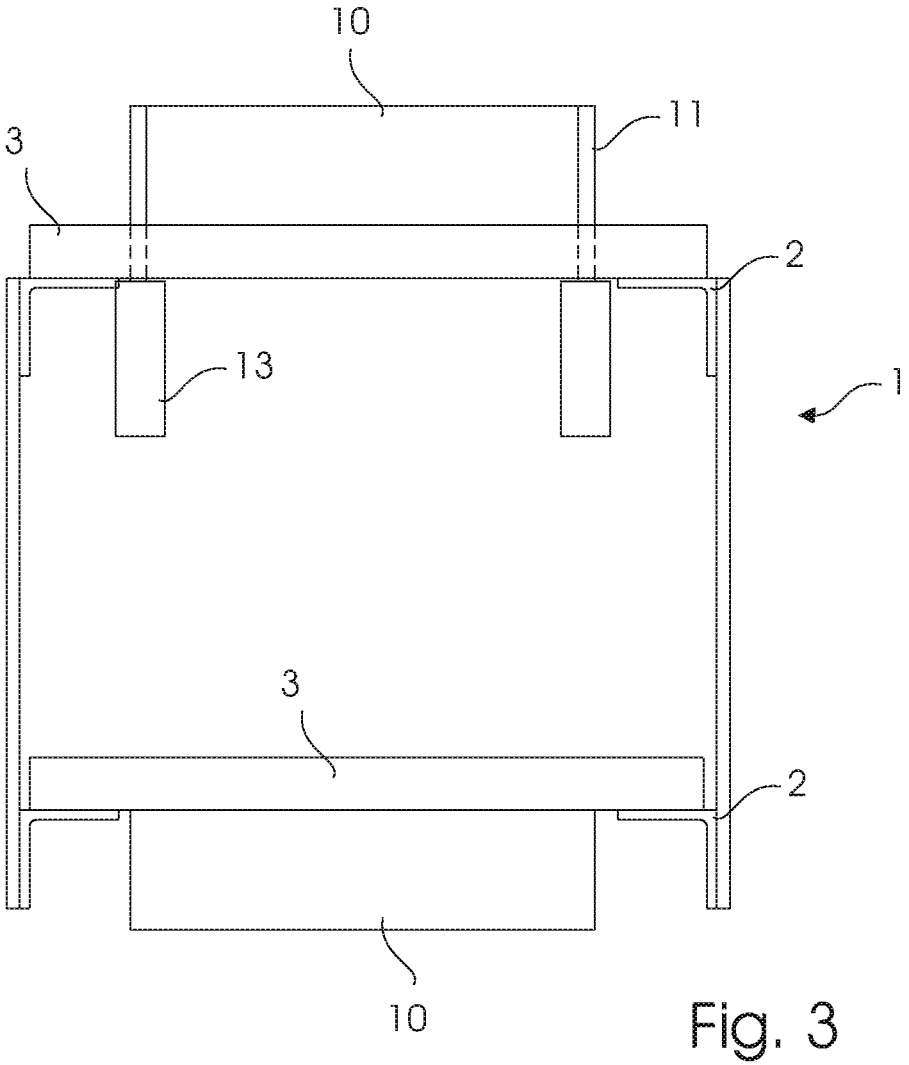
FIG. 3 shows a section taken along the line III-III in FIG. 2.

FIGS. 1, 2 and 3 show that the flight conveyor according to the invention comprises a frame 1 with supports 2 for slidingly carrying a number of segments 3 which by means of shafts 4 are connected to each other and in an endless row are running over drive sprockets 5 and an idler sprockets 6 during operation as the drive sprocket engages teeth 7 formed on the underside of the segments.

Only the axle 5 and the axle 6 of respectively the drive—and idler sprockets are seen in the figures.

The row of segments has an upper row part 8 and a lower row part 9. The segments of the upper row part serve as support for the material (not shown) to be conveyed from a lower position at the idler sprockets 6 to a higher position at the drive sprockets 5.

The conveyor is, as can be seen in FIGS. 1 and 2, at the beginning tilting so that the material can be elevated to the wanted level. At this level the conveyor is extending into a horizontal direction above e.g. a container (not shown) for collecting the conveyed material.

To prevent the conveyed material from sliding down the tilted part of the conveyor during operation the conveyor is equipped with flights 10 which are pivotally mounted on each their shaft 4.

Figure 4:
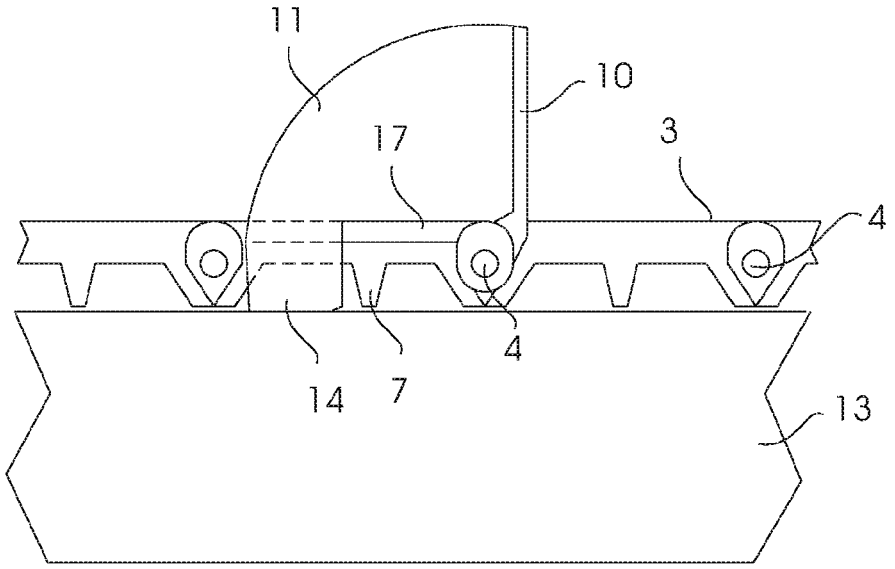
FIG. 4 is a lateral view of a fragment of the upper part of the flight conveyor according to the invention in one embodiment.
Figure 5:
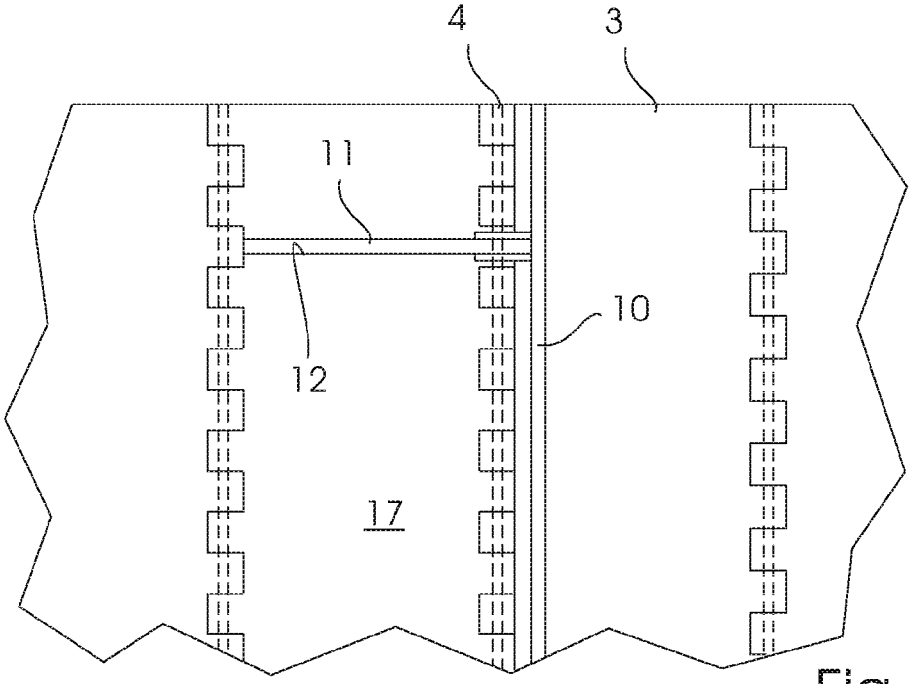
FIG. 5 shows the same seen from above.

FIGS. 4 and 5 show that each flight has a shape like a plate. On the back of the flight is mounted a slide 11 which extends through a slit 12 in the previous segment.

The width of the slit corresponds to the width of the slide. The back of each slide moreover has a shape like a sector of a circle with the centre placed in the axis of the shafts and a radius having a length corresponding to the distance from the axis of the axle to the distant end of the slit.

This implies that the slide fills the slit and that conveyed material therefore is not able to penetrate through the slit.

In this case two rails 13 are extending between the idler sprocket 6 and the drive sprocket 5 below the upper row part 8. Each slide 11 is moreover formed with a slide shoe 14.

The slide shoes 14 of the slides 11 are sliding on the rails 13 while travelling the distance from the idler sprocket to the drive sprocket whereby the flights 10 are kept in a perpendicular position in relation to the upper row of segments. In this position the flights are effectively able to prevent the conveyed material from sliding down the tilted part of the conveyor and safely bring the material along in the conveying direction.

Some materials are rather sticky, for example piece-formed products like feta cubes, paste stuffing and paste screws. The products usually go to waste when they during operation adhere to the surface of the segments and the flights of the conveyor.

As can be seen in FIG. 2, a scraper 15 with an edge 16 according to the invention is provided at the drive sprocket 5 for overcoming this problem. Adhered products are, by means of the edge of the scraper, scraped off the surfaces of the segment and flights passing the scraper during operation. The removed products are collected in e.g. a container and can be utilized as well as the other conveyed products.

Each flight has, as mentioned above, a shape like a plate. In the segment behind the flight is formed a recess 17 corresponding to the shape of this plate. The recess can therefore accommodate the flight.

The upper face of the rail 1 extends at the drive sprocket 5 into a descending curve 18 whereby the slide shoe 14 of the slide 11 gradually leaves the rail with the result that the flight at the scraper is pivoted into the recess 17 of the previous segment with the surface on a level with the surface of the other segments.

The edge 16 of the scraper 15 is placed close to or is abutting the surfaces of the flights and segments successively passing the scraper thereby removing adhered products.

At the idler sprocket the slide shoe 14 of each slide 11 gradually engages an opposite curve 19 on the rail 13 whereby the flight 10 is turned back to the position perpendicular on the upper row of segments 8.

Figure 6:
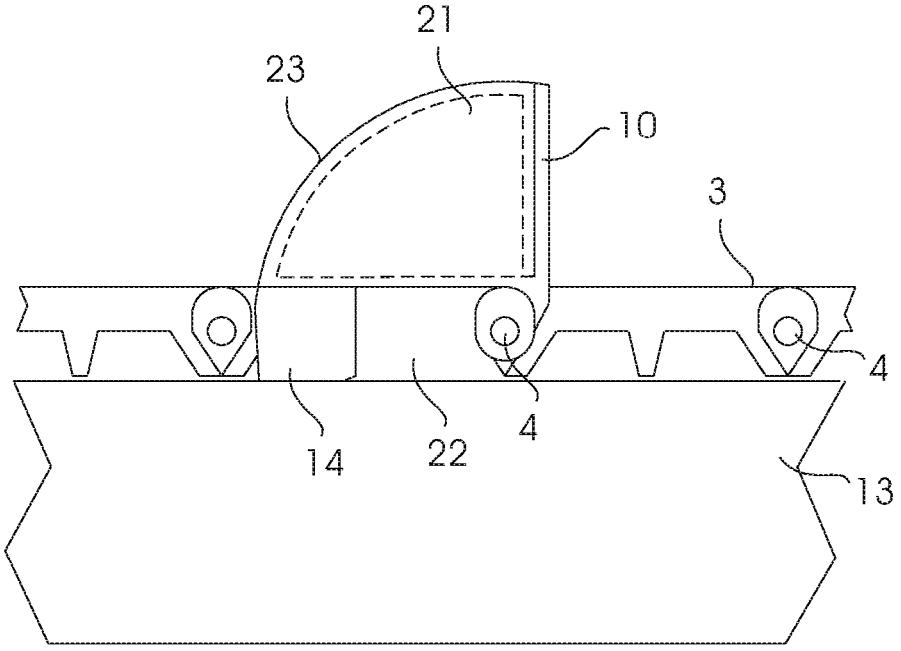
FIG. 6 is a lateral view of a fragment of the upper part of the flight conveyor according to the invention in another embodiment.
Figure 7:
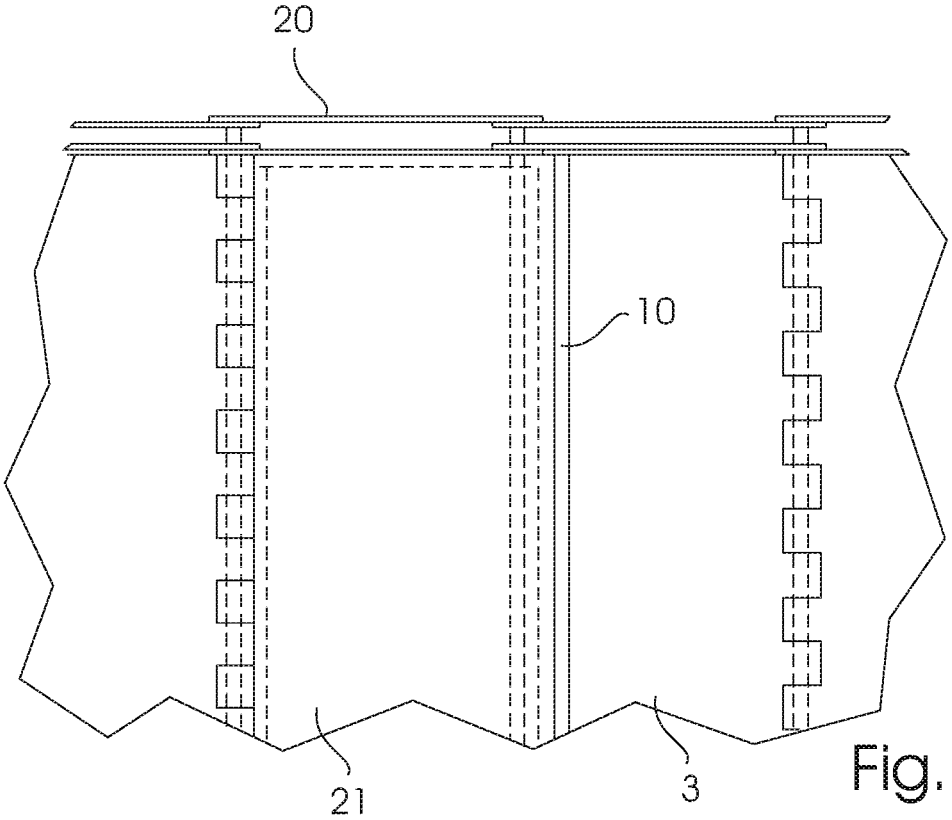
FIG. 7 shows the same seen from above.

FIGS. 6 and 7 show fragmentarily another embodiment of the flight conveyor according to the invention. This embodiment corresponds in the main to the embodiment shown in FIGS. 4 and 5. Identical parts therefore are denoted with same numerals.

In this case the shafts 4 of the flight conveyor are connected to two opposite chains 20 placed at each their side of the rows of segments. FIG. 7 shows only one of said chains.

During operation each chain is running over a drive sprocket (not shown) and an idler sprocket (not shown) rotatably mounted on the frame of the conveyor belt.

Each slide 21 has a width corresponding to the width of the segments between the chains. The slide can be massive but is in the example shown formed as a tube, the end of which may be closed.

Instead of a slit in the previous segment as shown in FIGS. 4 and 5, said segment has, in this case, been removed leaving a through opening 22 for allowing the slide 21 of the flight 10 to engage the underlying rail 13.

The slide fills the through opening so that the cylinder face formed back 23 of the slide is passing close by the adjoining segment when the flight is pivoting in said opening during operation whereby products adhered to the back of the slide are removed.

In the figures it is shown and above is supposed that each segment is extending over the total width of the flight conveyor in one piece. The segment can however, within the scope of the invention, consist of more pieces that in all are extending over the total width of the flight conveyor.

What is claimed is:

1. A flight conveyor of the kind which is arranged for conveying a material from one position to another, comprising, a frame, at least one drive wheel and at least one idler wheel rotatably mounted on the frame, a number of segments for supporting the material, a number of shafts for pivotally interconnecting the segments to an endless row which has an upper row part and lower row part and is running, during operation, over the at least one drive wheel and the at least one idler wheel, and a number of conveyor flights for bringing the material along in the conveying direction, wherein:

the flights are *each* pivotally mounted on [each] *their* shaft,

*at least one rail is extending between the idler wheel and the drive wheel in an area below the upper row part,*

*at least one slide, which is mounted on the back of each flight, seen in the conveying direction, is slidingly supported by the at least one rail,* the segment behind each flight is formed with [a] *at* least one through slit which fits the slide on the flight,

[at least one rail is extending between the idler wheel and the drive wheel in an area below the upper row part, at least one slide, which is mounted on the back of each flight, seen in the conveying direction, is slidingly supported by the at least one rail,]

removing means is arranged at the drive wheel for successively removing adhered material from segments and flights passing the removing means during operation, and the flights can pivot freely around their shaft when transported between the removing means and the at least one rail.

2. A flight conveyor according to claim 1, wherein the at least one rail is only extending between the idler wheel and the drive wheel in an area below the upper row part.

3. A flight conveyor according to claim 1, wherein the removing means comprises at least one scraper having an edge which is close to or abuts the surface of segments and flights passing the scraper.

4. A flight conveyor according to claim 1, wherein the back of each slide has a shape like a sector of a circle with the centre placed in the axis of the shafts and a radius having a length corresponding to the distance from the axis of the axle to the distant end of the slit.

5. A flight conveyor according to claim 1, wherein the height of each flight measured from the axis of the shaft corresponds to the radius of the sector of circle of the slide.

6. A flight conveyor according to claim 1, wherein the segment behind each flight is formed with a recess corresponding at least in the main to the shape of the flight.

7. A flight conveyor according to claim 1, wherein the upper face of both ends of the at least one rail extends into a descending curve.

8. A flight conveyor according to claim 1, wherein each slide is equipped with a slide shoe for sliding on the rail during operation.

9. A flight conveyor of the kind which is arranged for conveying a material from one position to another, comprising, a frame, at least one drive wheel and at least one idler wheel rotatably mounted on the frame, a number of segments for supporting the material, a number of shafts for pivotally interconnecting the segments to an endless row which has an upper row part and lower row part and is running, during operation, over the at least one drive wheel and the at least one idler wheel, wherein the shafts of the flight conveyor are connected to two opposite chains placed at each [their] side of the rows of segments, and that each chain, during operation, is running over a drive sprocket and an idler sprocket rotatably mounted on the frame [of the conveyor belt], and a number of conveyor flights for bringing the material along in the conveying direction, wherein:

the flights are *each* pivotally mounted on [each] *their* shaft, at least one rail is extending between the idler wheel and the drive wheel in an area below the upper row part, at least one slide, which is mounted on the back of each flight, seen in the conveying direction, is slidingly supported by the at least one rail, a [scraper] *scraping member* is arranged at the drive wheel for successively removing adhered material from segments and flights passing the [scraper] *scraping member* during operation, and the flights can pivot freely around their shaft when transported between the [scraper] *scraping member* and the at least one rail.

[10. A flight conveyor according to claim 9, wherein each slide has a width corresponding to the width of the segments between the chains and that the previous segment has been removed.]

11. A flight conveyor according to claim 9, wherein the segment behind each flight is formed with a recess corresponding at least in the main to the shape of the flight.

12. A flight conveyor according to claim 9, wherein the upper face of both ends of the at least one rail extends into a descending curve.

13. A flight conveyor according to claim 9, wherein each slide has a width corresponding to the width of the segments between the chains and that the previous segment has been removed.

14. A flight conveyor of the kind which is arranged for conveying a material from one position to another, comprising, a frame, at least one drive wheel and at least one idler wheel rotatably mounted on the frame, a number of segments for supporting the material, a number of shafts for pivotally interconnecting the segments to an endless row which has an upper row part and lower row part and is running, during operation, over the at least one drive wheel and the at least one idler wheel, and a number of conveyor flights for bringing the material along in the conveying direction, wherein:

the flights are *each* pivotally mounted on [each] *their* shaft,

*at least one rail extends between the idler wheel and the drive wheel in an area below the upper row part,*

*at least one slide, which is mounted on the back of each flight, seen in the conveying direction, is slidingly supported by the at least one rail,* the segment behind each flight is formed with [a] *at* least one through slit which fits the slide on the flight,

[at least one rail extends between the idler wheel and the drive wheel in an area below the upper row part, at least one slide, which is mounted on the back of each flight, seen in the conveying direction, is slidingly supported by the at least one rail,]

a [scraper] *scraping member* is arranged at the drive wheel for successively removing adhered material from segments and flights passing the [scraper] *scraping member* during operation, and the flights can pivot freely around their shaft when transported between the [scraper] *scraping member* and the at least one rail.

15. A flight conveyor according to claim 14, wherein the back of each slide has a shape like a sector of a circle with the centre placed in the axis of the shafts and a radius having a length corresponding to the distance from the axis of the axle to the distant end of the slit.

16. A flight conveyor according to claim 14, wherein the segment behind each flight is formed with a recess corresponding at least in the main to the shape of the flight.

17. A flight conveyor according to claim 14, wherein the upper face of both ends of the at least one rail extends into a descending curve.

18. A flight conveyor according to claim 14, wherein each slide has a width corresponding to the width of the segments between the chains and that the previous segment has been removed.

*19. A flight conveyor of the kind which is arranged for conveying a material from one position to another, comprising,*

*a frame,*

*at least one drive wheel and at least one idler wheel rotatably mounted on the frame,*

*a number of segments for supporting the material,*

*a number of shafts for pivotally interconnecting the segments to an endless row which has an upper row part and lower row part and is running, during operation, over the at least one drive wheel and the at least one idler wheel, and*

*a number of conveyor flights for bringing the material along in the conveying direction, wherein:*

*the flights are pivotally mounted on some of the shafts,*

*at least one rail is extending between the idler wheel and the drive wheel in an area below the upper row part,*

*at least one slide, which is mounted on the back of each flight, seen in the conveying direction, is slidingly supported by the at least one rail,*

*the segment behind each flight is formed with at least one through slit which fits the slide on the flight,*

*removing means is arranged at the drive wheel for successively removing adhered material from segments and flights passing the removing means during operation, and*

*the flights can pivot freely around their respective shafts when transported between the removing means and the at least one rail.*

*20. A flight conveyor according to claim 19, wherein the removing means comprises at least one scraper having an edge which is close to or abuts the surface of segments and flights passing the scraper.*

*21. A flight conveyor according to claim 19, wherein each slide is equipped with a slide shoe for sliding on the rail during operation.*

*22. A flight conveyor of the kind which is arranged for conveying a material from one position to another, comprising,*

*a frame,*

*at least one drive wheel and at least one idler wheel rotatably mounted on the frame,*

*a number of segments for supporting the material,*

*a number of shafts for pivotally interconnecting the segments to an endless row which has an upper row part and lower row part and is running, during operation, over the at least one drive wheel and the at least one idler wheel, wherein the shafts of the flight conveyor are connected to two opposite chains placed at each side of the rows of segments, and that each chain, during operation, is running over the at least one drive wheel and the at least one idler wheel rotatably mounted on the frame, and*

*a number of conveyor flights for bringing the material along in the conveying direction, wherein:*

*the flights are pivotally mounted on some of the shafts,*

*at least one rail is extending between the idler wheel and the drive wheel in an area below the upper row part,*

*at least one slide, which is mounted on the back of each flight, seen in the conveying direction, is slidingly supported by the at least one rail,*

*a scraping member is arranged at the drive wheel for successively removing adhered material from segments and flights passing the scraping member during operation, and*

*the flights can pivot freely around their respective shafts when transported between the scraping member and the at least one rail.*

*23. A flight conveyor according to according to claim 22, wherein each slide has a width corresponding to the width of the segments between the chains and that the previous segment has been removed.*

*24. A flight conveyor according to claim 22, wherein the segment behind each flight is formed with a recess corresponding at least in the main to the shape of the flight.*

*25. The flight conveyor according to claim 22 wherein the front surface of each flight passes the removing means at substantially the same level as the front surface of surrounding segments.*

*26. The flight conveyor according to claim 22 wherein the flight is a flat plate.*

*27. A flight conveyor of the kind which is arranged for conveying a material from one position to another, comprising,*

*a frame,*

*at least one drive wheel and at least one idler wheel rotatably mounted on the frame,*

*a number of first and second segments having surfaces for supporting the material with the second segments having at least one through slit therein,*

*a number of shafts for pivotally interconnecting the segments into a conveyor belt running over the at least one drive wheel and the at least one idler wheel, and*

*a number of conveyor flights for bringing the material along in the conveying direction, wherein:*

*the flights are pivotally mounted on the shafts associated with the front end of the second segments taken in the conveying direction,*

*at least one rail is provided between the idler wheel and the drive wheel,*

*at least one slide is mounted on the back of each flight, seen in the conveying direction,*

*the second segments are positioned behind the flights with their through slit fitting the slide on their respective flights,*

*removing means is arranged with respect to the conveyor belt for successively removing adhered material from the surfaces of the segments and flights passing the removing means during operation, and*

*the flights can pivot freely around their respective shafts when transported between the removing means and the at least one rail.*

*28. The flight conveyor according to claim 27 wherein the flight is a flat plate and the removing means is a scraper arranged at the drive wheel to remove adhered material from the surfaces of the segments and flights passing the scraper during operation.*

*29. The flight conveyor according to claim 27, wherein the back of each slide has a shape like a sector of a circle with the center placed in the axis of the shafts and a radius having a length corresponding to the distance from the axis of the shaft to the distant end of the slit.*

*30. The flight conveyor according to claim 27 wherein the second segment is formed with a recess corresponding at least in the main to the shape of the flight.*

*31. The flight conveyor according to claim 27 wherein the front surface of each flight passes the removing means at substantially the same level as the surfaces of surrounding segments.*

*32. The flight conveyor according to claim 27 wherein the through slit extends transversely over a major portion of the second segment and the respective slide fills the opening of the through slit.*

*33. A flight conveyer conveyor belt comprising:*

*a number of segments for supporting the material,*

*a number of shafts for pivotally interconnecting the segments in an endless row,*

*a number of conveyor flights, each having at least one slide mounted on the back of each flight,*

*the flights being pivotally mounted on some of the shafts, with the segments behind the flights being formed with at least one through slit which fits the slide on the flight.*

*34. The belt according to claim 33, wherein the through slit extends transversely over a major portion of its segment and the respective slide fills the opening of the through slit.*

*35. The belt according to claim 33 wherein the segment behind each flight is formed with a recess corresponding at least in the main to the shape of the flight.*

*36. The belt according to claim 33 wherein the back of each slide has a shape like a sector of a circle with the center placed in the axis of the shafts and a radius having a length corresponding to the distance from the axis of the shaft to the distant end of the slit.*

*37. The belt according to claim 33 wherein a plurality of slides are mounted on the back of the flights.*

*38. The belt according to claim 33 wherein each slide is formed with a slide shoe.*

*39. The conveyor belt according to claim 33 wherein first and second segments are provided for supporting the material, the first segments being substantially solid and the second segments having at least one through slit therein to receive the slide.*

*40. The belt according to claim 39 wherein the through slit extends transversely over a major portion of the second segment and the respective slide fills the opening of the through slit.*

*41. The belt according to claim 39 wherein the second segment is formed with a recess corresponding at least in the main to the shape of the flight.*

*42. The belt according to claim 39 wherein a plurality of slides are mounted on the back of the flights.*

*43. The belt according to claim 39 wherein each slide is formed with a slide shoe.*

*44. In a flight conveyer having a frame, at least one drive wheel and at least one idler wheel rotatably mounted on the frame, at least one rail between the idler wheel and the drive wheel and removing means arranged near the drive wheel, a conveyor belt comprising:*

*a number of segments for supporting the material,*

*a number of shafts for pivotally interconnecting the segments in an endless row,*

*a number of conveyor flights,*

*the flights being pivotally mounted on some of the shafts,*

*at least one slide mounted on the back of each flight,*

*the segments behind the flights are formed with at least one through slit which fits their slides on their respective flights,*

*wherein the slides of the flights are adapted to slide along the rail causing the flights to pivot to a substantially perpendicular position to the segments in the conveying direction and then leave the rail allowing the flights to pivot freely around their respective shafts.*

*45. The belt according to claim 44 wherein the through slit extends transversely over a major portion of its segment and the respective slide fills the opening of the through slit.*

*46. The belt according to claim 44 wherein the segment behind each flight is formed with a recess corresponding at least in the main to the shape of the flight.*

*47. The belt according to claim 44 wherein the back of each slide has a shape like a sector of a circle with the center placed in the axis of the shafts and a radius having a length corresponding to the distance from the axis of the shaft to the distant end of the slit.*

*48. The belt according to claim 44 wherein a plurality of slides are mounted on the back of the flights.*

*49. The belt according to claim 44 wherein each slide is formed with a slide shoe.*

*50. The belt according to claim 44 wherein first and second segments are provided for supporting the material, the first segments being substantially solid and the second segments having at least one through slit therein to receive the slide.*

*51. The belt according to claim 50 wherein the through slit extends transversely over a major portion of the second segment and the respective slide fills the opening of the through slit.*

*52. The belt according to claim 50 wherein the second segment is formed with a recess corresponding at least in the main to the shape of the flight.*

*53. The belt according to claim 50 wherein the front surface of each flight passes the removing means at substantially the same level as the front surface of surrounding segments.*

*54. The belt according to claim 50 wherein a plurality of slides are mounted on the back of the flights.*

*55. The belt according to claim 50 wherein each slide is formed with a slide shoe.*

* * * * *